United States Patent [19]

Beeson et al.

[11] Patent Number: 5,151,331
[45] Date of Patent: Sep. 29, 1992

[54] SOLVENT BLOCKERS AND MULTILAYER BARRIER COATINGS FOR THIN FILMS

[75] Inventors: Charles L. Beeson, Hopewell; Raymond T. Cole, Midlothian, both of Va.; Gedeon I. Deak, Wilmington, Del.; Harbeson H. Leidolf, Jr., Richmond, Va.

[73] Assignee: E. I. du Pont de Nemours and Company, Wilmington, Del.

[21] Appl. No.: 831,702

[22] Filed: Feb. 5, 1992

Related U.S. Application Data

[62] Division of Ser. No. 565,124, Aug. 10, 1990, Pat. No. 5,102,699.

[51] Int. Cl.[5] .................. B32B 27/08; B65D 85/72
[52] U.S. Cl. .................. 428/475.5; 426/127; 428/36.7; 428/476.1; 428/483; 428/509; 428/510; 428/511; 428/513; 428/514; 428/515; 428/516; 428/518; 428/520
[58] Field of Search ............... 428/475.5, 476.1, 483, 428/509, 510, 511, 513, 514, 515, 516, 518, 520, 36.7; 427/379, 411, 412.1, 412.2, 412.3, 412.4, 412.5, 393.5

[56] References Cited

U.S. PATENT DOCUMENTS 5,102,699 4/1992 Beeson ........................ 427/379

Primary Examiner—James C. Cannon

[57] ABSTRACT

A film comprising alternating layers of polyvinylidene chloride resin and a solvent barrier such as polyvinyl alcohol provides superior barrier properties. Barrier and mechanical properties are enhanced when formulation additives are present at customary levels only in the outermost layers.

13 Claims, 1 Drawing Sheet

5,151,331

SOLVENT BLOCKERS AND MULTILAYER BARRIER COATINGS FOR THIN FILMS

This is a division of application Ser. No. 565,124, filed Aug. 10, 1990, now U.S. Pat. No. 5,102,699.

BACKGROUND OF THE INVENTION

This invention relates to films with thick or multiple layers of polymeric coating and processes for preparing such films.

Several methods are known for applying thick or multiple coating layers to films or other objects. For example, U.S. Pat. No. 3,959,526 discloses a process of preparing a high barrier, heat sealable packaging material having a low level of total retained solvents. A sub-coating of a high barrier vinylidene chloride copolymer and a top coating of a heat sealable vinylidene chloride copolymer are applied from solution to a film. Application of the top coating from a dilute solution containing about 5 to 10% solids to a solids coating weight of about 0.5 to 3 g/m$^2$ provides a low level of solvent retained in the coatings after a drying step.

U.S. Pat. No. 4,781,978 discloses articles with a coating used for promoting adhesion. The coating is formed from a blend comprising at least one polymer containing carbonylamide functional groups (e.g. polyethyloxazoline) and at least one hydrophobic polymer substantially free of acidic functional groups. Coated articles such as PET film can be prepared by evaporating a solvent carrier of the polymer blend.

U.S. Pat. No. 3,950,579 discloses a method of forming relatively thick deposits of polymeric material on a surface of small threaded articles which comprises forming a thin coating on the surface of a solution of the polymeric material, preferably draining the excess solution, then drying the coating, applying a barrier coating such as polyvinyl alcohol to the polymeric material to protect it from attack by solvent, and applying a second thin coating of a solution of the polymeric material. Coating is by successive immersion in baths of the barrier material or by other bulk treatment. This treatment permits the required amount of polymeric material to be deposited in the grooves of the article while preventing articles in bulk from sticking together in an agglomerated mass. The polymeric material is a polyurethane or preferably an acrylic or methacrylic resin, and an adhesion promoting material such as a polyamide or a silicone resin is used. Such coatings provide increased friction between the threaded article and a mating nut.

Other references disclose film structures with varied polymer layers. U.S. Pat. No. 4,741,970 discloses a thermoplastic laminate structure wherein one of the layers is an adhesive comprising a poly-2-oxazoline. The adhesive is well suited for adhering saran to polypropylene.

U.S. Pat. No. 4,565,742 discloses a film laminate prepared by a variety of lamination and coating processes. The film comprises a base film of e g. oriented polyester or nylon, a coating of polyvinylidene chloride, and a sealant layer of e.g. ethylene vinyl acetate copolymer. A second coating of PVDC can be applied to the base film by heat lamination or through an aqueous PVDC dispersion. When the base film is nylon, the first PVDC coating tends to prevent water in the second PVDC dispersion from wrinkling or curling the underlying film.

Japanese patent application 59-152929 discloses a method for treating a thermoplastic polyester container comprising coating the container with a polymer from dispersion or solution. In one example a first coating of saponified polyvinyl acetate is applied from solution, then a vinylidene chloride polymer latex, followed by drying.

The present invention provides a means for applying multiple layers of solvent-borne coatings to films without contamination of previously-applied layers by the solvent. The invention also provides films which have outstanding barrier and processing properties.

SUMMARY OF THE INVENTION

The present invention provides a process for applying multiple layers of polymeric coatings to a film comprising the steps of:

(a) applying a coating of solvent-borne polymer to at least one surface of said film;

(b) removing substantially all of the solvent from said coating;

(c) thereafter applying to the at least one coated surface of said film a polymeric barrier layer;

(d) applying to said polymeric barrier layer a subsequent coating of solvent-borne polymer, carried in a solvent to which said polymeric barrier layer is substantially impermeable; and (e) removing the solvent from the subsequent coating; whereby the solvent carrying said subsequent coating does not permeate the underlying coating.

The invention further provides a film prepared by the above process, and in addition a coated film having good barrier and handling properties, comprising:

(a) a substrate film;

(b) at least one underlayer of vinylidene chloride polymer containing less than about 3% by weight organic formulation additives; and (c) at least one overlayer of vinylidene chloride polymer containing at least about 3% by weight of organic formulation additives.

DETAILED DESCRIPTION OF THE INVENTION

Figure 1:
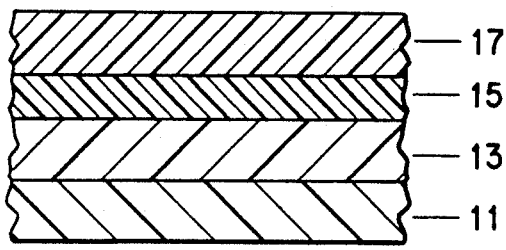
FIGS. 1 and 2 show one embodiment of the present invention, with coating layers applied to a single side or both sides of a sheet.

Certain barrier coatings and other coatings are commonly applied to films by solvent-coating processes. Solvent coating processes are generally well known and are illustrated by U.S. Pat. No. 4,565,742, the disclosure of which is incorporated herein by reference. Briefly, such coatings can be applied by dip tank, spray, brush, roller, doctor knife, air knife, gravure, and other methods known to those skilled in the art. After application of the solvent-borne coating, the solvent is removed by drying, normally at elevated temperatures. If thick coatings are desired, it is often difficult or slow to adequately remove solvent, since much of it must first diffuse through a layer of polymer. Even if the thick coating is applied in a plurality of passes, solvent from the outer layer or layers will permeate the inner layer or layers, and similarly will be difficult to remove. One embodiment of the present invention avoids these problems by the use of one or more solvent-barrier or solvent-blocker coatings, as more fully described below.

Coatings are applied to a substrate film or base film, which can be any of a number of polymeric materials, including polyesters such as PET, nylon, cellophane, polyolefins, paper, or paperboard.

A first layer of solvent-borne coating is applied to the substrate film by known means. This coating may be any of a variety of polymeric coatings, such as olefin homo- and copolymers, polyesters, polyethyleneimine, polyvinyl chloride, and copolymers thereof It is preferred that the coating is a layer of a resin such as a vinylidene chloride (VDC) polymer. VDC copolymers are copolymers of 65 to 96% by weight of vinylidene chloride and 4 to 35% of one or more comonomers such as vinyl chloride, acrylonitrile, methacrylonitrile, methyl methacrylate, or methyl acrylate, and are generally referred to as saran. A suitable grade contains about 7 weight percent methacrylonitrile, 3 weight percent methyl methacrylate, and 0.3 weight percent itaconic acid comonomers. Many VDC polymers customarily include formulation additives such as waxes, fatty acids and derivatives thereof, particulate matter, and polymeric species such as mixed polyesters. Such additives may be useful to reduce brittleness and stiffness of the polymer or to improve its heat sealability and handling properties.

The first polymeric layer, if it is a VDC polymer composition, is normally applied from a 10-30 weight percent solution in a solvent mixture of tetrahydrofuran and toluene in a ratio of about 50:50 to about 80:20 (alternatively, methyl ethyl ketone and toluene) by known techniques, followed by drying in a hot air dryer. The thickness of such a layer, in order to exhibit acceptable drying time, characteristically corresponds to about 1 to about 4 and preferably about 2 to about 3 g solids/m$^2$ surface area. The present invention provides a means for obtaining an effectively greater thickness of such a layer by use of a polymeric barrier layer.

Next in succession after the first polymeric layer is the polymeric solvent-barrier layer. This is normally a polymeric layer which is selected to be substantially impermeable to the solvent used to apply the first layer (and the top layer, which is normally, but not necessarily, the same as the first layer). When VDC polymer is used as the first layer, suitable polymeric barrier layers may be prepared from polyvinyl alcohol, preferably at least 95% saponified; copolymers of ethylene and vinyl alcohol wherein the amount of copolymerized ethylene is up to about 50 mole %, preferably up to about 30 mole %; methyl methacrylate vinyl alcohol copolymers, polyoxazoline, mixtures of these materials, and the like. Alternatively a layer of an inorganic glass coating could be effective. Polyvinyl alcohol, if used, may contain a small amount of a crosslinking agent (about 1 to about 10 % by weight) in order to improve adhesion and reduce moisture sensitivity. These materials are for practical purposes insoluble in and impermeable to the toluene-tetrahydrofuran solvent used for VDC polymer, under the conditions of time and temperature encountered in the coating processes. Such layers are applied by techniques similar to those described above, normally from an aqueous solution, typically containing about 5 to about 20% dissolved polymer. Since the VDC polymer underlayer is insoluble in and not swelled by water, the application of an aqueous coating does not contaminate the underlayer with water or other undesirable solvent. Thereafter, the polymer of the solvent-barrier layer is dried and forms an effective solvent barrier.

Atop the solvent-barrier layer is applied an outer layer of additional polymeric resin. This outer layer will normally be substantially similar to the inner layer, although this is not required. The outer polymer (e.g. a PVDC or acrylic formulation) is dissolved or otherwise dispersed in a solvent which does not permeate the solvent-barrier layer; thus the under layer is not contaminated by the solvent and the film can be readily dried. In this way a film can be prepared with a thicker overall polymeric coating than would otherwise be economically possible.

Figure 2:
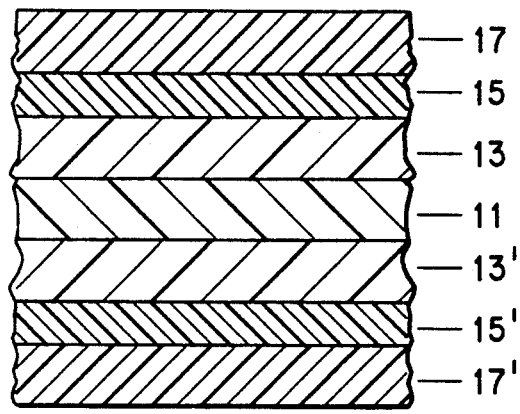

FIG. 1 shows a schematic cross section of a film prepared by the present invention. Layer 11 represents the base film, which is coated with a VDC polymer layer, 13. The solvent-barrier layer 15 is next in succession, and the outermost layer, 17, is another VDC polymer layer. While the above process has been set forth as coating a single side of the base film, it is possible to coat both sides simultaneously, resulting in a symmetrical, multiple layered structure. Such a structure is shown in FIG. 2, in which layers 13', 15', and 17' correspond to layers 13, 15, and 17, but are located on the opposite side of the base film 13. Other coating schemes are also possible. For example, the above process can be repeated as desired to build up a multiple layer structure of any arbitrary degree of thickness.

Such structures, provided with separate and distinct VDC polymer layers, provide the opportunity for precise tailoring of each layer to perform a specific function. For example, VDC polymer layers can be used for their barrier properties to prevent permeation by gases such as oxygen, water vapor, or carbon dioxide. It has now been found that VDC polymers with organic formulation additives entirely absent or present at only a low level have better barrier properties than do comparable VDC polymers containing formulation additives. Using the process of the present invention, it has been found possible to provide a film with one or more under layers of VDC polymer containing only small amounts of formulation additives which thereby provides outstanding barrier performance. The outer or outermost layer of VDC polymer can contain formulation additives in an amount sufficient to provide heat sealability, ease of handling, static resistance, resistance to blocking, machinability, heat seal jaw release, good ink receptivity, and adhesion. The polyvinyl alcohol, which is used as a solvent-barrier layer, can itself provide additional barrier properties to the final structure. The resulting composite film structure has the unusually combination of very good barrier properties and good mechanical and handling properties.

In addition, use of an underlayer having only a small amount of organic formulation additive permits better wetting when an aqueous solution of polyvinyl alcohol is applied thereto and provides better adhesion between the layers in the resulting structure.

In order to exhibit excellent barrier properties, the under layer of VDC polymer should contain less than about 3 weight percent of the formulation additives. It is believed that the barrier properties improve as the amount of such additives decrease, so that it is preferred that the amount of the formulation additives be less than about 1 weight percent, and for best results less than about ½ weight percent. Conversely, for good mechanical and handling properties, the amount of such additives in the surface layer should be at least about 3 weight percent and may suitably be 6 or 7 weight percent or even as high as 10 weight percent. Either VDC polymer layer may contain small amounts of inorganic materials which do not interfere with the operation of the present invention. Examples of such inorganic materials include finely divided talc, which serves as an antiblocking agent and calcium oxide, which serves as an acid scavenger.

Figure 3:
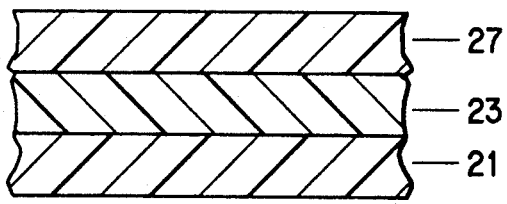
FIGS. 3 and 4 similarly show a second embodiment of the present invention.
Figure 4:
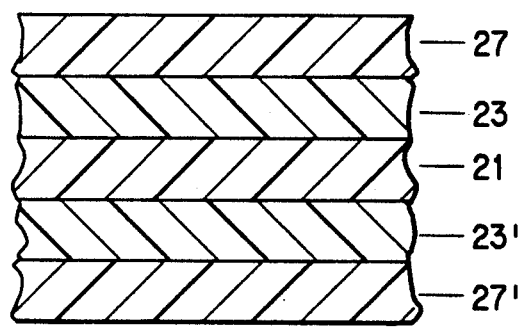

Certain of the advantages of the present invention relating to improved barrier and handling properties can be obtained even when a multiple layered film is prepared without use of a solvent-barrier layer. FIG. 3 illustrates such a film. Layer 21 is a base film, as described above. On the base film is a layer 23 of VDC polymer containing only a very low level of organic formulation additives, as described. On the surface is a layer 27 of VDC polymer containing a higher level of such additives, suitable to provide the aforementioned desired properties. FIG. 4 shows a corresponding structure in which the coating layers are applied to both sides. Although such structures may not be dried so readily as the structures which incorporate the solvent-barrier layer, the ultimate barrier properties are exceptional.

Films of the present invention may be used for wrapping products that need oxygen, aroma, or moisture protection. Examples include refrigerated entrees, cookies, cereals, baked goods, shelf-stable dry soups, flavored drinks, cheeses, and soaps. The barrier properties can extend product shelf-life, secure product flavor-aroma, and prevent undesirable odor from getting into the package. In addition to providing excellent barrier properties, the present invention provides benefits of machinability, printability, clarity, and heat sealability.

EXAMPLES 1-7 AND COMPARATIVE EXAMPLES C1-C4

Films of PET about 28 cm wide were coated using a 28 cm (11 inch) wide doctor roll coater fitted with an unwind and a windup stand for flexible film. On this device film is unwound and pulled through a dip pan containing the coating bath. The wet film is pulled through the doctor or metering rolls and into a 2 meter (7 foot) dryer where the solvent is removed. Dried film is wound up at a windup station outside the dryer. A first coating of VDC polymer (about 90% vinylidene chloride, 7% methacrylonitrile, 3% methyl methacrylate, and 0.3% itaconic acid comonomers, in a coating formulation set forth more fully in Comparative Example C5) was applied by doctor roll coating a solution of about 15% of the polymer in a solvent mixture of 65% tetrahydrofuran and 35% toluene. This first coating was applied in a thickness indicated in Table I, the reported thicknesses being accurate to about ±10%. The solvent was removed and the film dried by passing the film at 23 m/min (75 feet/min) through a hot air dryer at 135°–140° C. for a residence time of 5.6 seconds. Thereafter a barrier layer of polyvinyl alcohol was applied using similar equipment. The polyvinyl alcohol was a medium-low viscosity, fully hydrolyzed resin, Elvanol ® 90-50, available from Du Pont. It was applied as an aqueous solution containing about 10% dissolved solids and dried by passing at 11 m/min (35 feet/min) through an oven at 150° C. for a residence time of 12 seconds. Where noted in the Table, the PVA layer contained a small amount of a crosslinking agent, Cymel TM 385, which is a methylated melamine formaldehyde resin from American Cyanamide. In some instances an acid catalyst (phosphoric acid at levels of 0.25 to 10% of the Cymel TM) was added to aid crosslinking. Atop this barrier layer was applied a second, outer coating of VDC polymer by the same process used to apply the underlying coating layer of VDC polymer. The outer coating was the same composition as the inner coating except that it contained conventional additives to promote anti-blocking, heat seal jaw release, and machinability. The additives amounted to about 7 percent by weight of the outer coating, including about 1 percent waxes, about 5 percent fatty acids and derivatives thereof, about ½ percent of a copolyester, and about 0.9 percent talc. Thickness of this coating is noted in Table I.

After the final drying step, the amount of retained solvent in the film was measured by headspace gas chromatography. The results, in Table I, show the remarkable reduction of retained solvent, reduced by one to two orders of magnitude compared to structures without the barrier layer (Comparative Examples C1 and C2).

The coated films of the present invention were tested for heat seal strength by bringing the outer VDC polymer layers of two sheets of film together under heat (140° C.) for 0.25 seconds at a pressure of about 34 kPa (5 psig). The data in Table I show that the films of the present invention exhibit acceptable heat seal strength.

Oxygen transmission of certain of the films was measured using a Mocon TM Ox-Trans TM instrument. The films exhibit excellent resistance to oxygen permeation, as shown in Table I.

TABLE I[a]

| Ex | Coat 1 VDC g/m² | PVOH g/m² | Cross link, % | Coat 2 VDC g/m² | Residual THF ppm | Residual Tol. ppm | Heat Seal g/cm | OTR[b] (% RH) |
| --- | --- | --- | --- | --- | --- | --- | --- | --- |
| 1 | 2.1 | 0.7 | 0 | 2.8 | 20 | 273 | 63 | <.03 (0) .03 (50) 4.2 (100) |
| 2 | 2.1 | 0.8 | 5 | 2.2 | 365 | 248 | 49 | <.03 (0) .06 (50) 4.0 (100) |
| 3 | 2.2 | 0.7 | 5[c] | 2.8 | — | — | 124 | .23[d] (100) |
| 4 | 2.2 | 0.5 | 0[c] | 1.9 | 55 | 304 | 85 | <.03[d] (100) |
| 5 | 2.0 | 0.6 | 0 | 2.2 | 79 | 290 | 67 | — |
| 6 | 2.0 | 0.6 | 5[c] | 2.3 | 57 | 212 | 83 | — |
| 7 | 2.0 | 0.9 | 0[c] | 2.3 | 34 | 163 | 75 | — |
| C1 | 3.0 | 0 | 0 | 3.0 | 1500 | 2406 | — | — |
| C2 | 2.0 | 0 | 0 | 2.7 | 2344 | 9016 | — | — |
| C3 | 2.4 | 0 | 0 | 0 | — | — | — | 6.7 (100) |

TABLE I-continued

| Ex | Coat 1 VDC g/m² | PVOH g/m² | Cross link. % | Coat 2 VDC g/m² | Residual THF ppm | Residual Tol. ppm | Heat Seal g/cm | OTR[b] (% RH) |
|---|---|---|---|---|---|---|---|---|
| C4 | 0 | 0 | 0 | 2.0 | — | — | — | 10.7 (100) |

[a]Entry of a hyphen (-) indicates the measurement was not made.
[b]Oxygen transmission rate in cm³/m²-atm-day.
[c]With acid catalyst.
[d]Low values may be due to experimental error.

EXAMPLES 8 and 9

The films of Examples 8 and 9, described in Table II, were made much as Example 1. Plant-scale coating apparatus was used, however, providing a film width of about 1.4 m. The coating speed was 60 m/min for the first VDC polymer layer and for the PVA layer. The first VDC polymer layer was dried at 135°–140° C. for 23 seconds. The polyvinyl alcohol solution was applied by a spraying process, rather than by a doctor roll and was dried at 150° C. for 3.4 seconds. Properties of the film are reported in Table II. Thickness of coating layers was measured at the left (l), center (c), and right (r) portions of the film.

The results show that (1) retained solvents are lower than expected for these heavy coating weights, (2) the crosslinking agent does not appear to cause an increase in heat seal strength, and (3) high humidity OTR values are lower than would be expected.

TABLE II

| Ex | Coat 1 VDC g/m² | PVOH g/m² | Cross link[a], % | Coat 2 VDC g/m² | Residual THF ppm | Residual Tol. ppm | Heat Seal g/cm | OTR[b] 0% | OTR[b] 50% | OTR[b] 100% |
|---|---|---|---|---|---|---|---|---|---|---|
| 8 | (l) 2.0 | 0.8 | 4.7 | 4.0 | 116 | 210 | 24 | 0.63 | 1.55 | 1.08 |
|   | (c) 2.0 | 0.8 |     | 3.5 |     |     |    | 0.93 | 3.56 | 1.40 |
|   | (r) 2.0 | 0.8 |     | 4.2 |     |     |    | 1.24 | 4.03 | 1.08 |
| 9 | (l) 2.0 | 0.8 | 4.7 | 3.9 | 200 | 229 | 28 | 0.46 | 1.86 | 1.55 |
|   | (c) 2.0 | 0.8 |     | 3.9 |     |     |    | 0.62 | 2.17 | 1.08 |
|   | (r) 2.0 | 0.8 |     | 3.3 |     |     |    | 0.62 | 1.24 | 1.08 |

[a]Crosslinking agent is Cymel ™ 385 + 0.8% phosphoric acid, based on dry weight of PVOH.
[b]Oxygen transmission rate in cm³/m²-atm-day at indicated relative humidity.

COMPARATIVE EXAMPLE C5

For reference purposes, a 12 micrometer (48 gauge) base film of PET was coated simultaneously on both sides with a coating composition substantially free from waxes and similar additives, as indicated (amounts may not add to 100% because of rounding):

| | |
|---|---|
| VDC (Dow ™ F-278, as in Ex. 1) | 98.0 wt. % |
| Goodyear Flexclad ™ PE-100 | 0.5 |
| Finely divided talc, 3–4 micrometer particles | 1.5 |
| Calcium oxide | 0.05 |

(Flexclad ™ is a polyester resin having a molecular weight of at least about 500, prepared by condensing a glycol and a polyfunctional acid, at least 70% of which is an aromatic acid.) This coating was applied as a 15 weight percent solids solution in a solvent of 65:35 tetrahydrofuran: toluene (and about 0.1% water). The total dry coating weight was 4.2 g/m². After drying and heat aging for development of VDC polymer crystallinity, oxygen transmission rate measurements were performed at 25° C. and the relative humidities indicated below. Results are given in cm³/m²-day-atm.

| % RH | Run 1 | Run 2 | Average |
|---|---|---|---|
| 0 | 2.22 | 2.11 | 2.17 |
| 50 | 2.29 | 2.25 | 2.27 |
| 80 | 2.57 | (not determined) | |
| 100 | 2.25 | 2.28 | 2.27 |

COMPARATIVE EXAMPLE C6

A 12 micrometer (48 gauge) base film of PET was coated simultaneously on both sides in the same manner as Example 5 with a VDC polymer composition with waxes and other additives. The coating composition was:

| | |
|---|---|
| VDC polymer (Dow ™ F-278) | 92.7 wt. % |
| Goodyear Flexclad ™ PE-100 | 0.5 |
| Finely divided talc, 3–4 micrometer particles | 0.9 |
| Calcium oxide | 0.06 |
| Behenic acid | 3.1 |
| Stearamide | 0.3 |
| Candelilla wax | 0.8 |
| Carnauba wax | 0.3 |
| Glycerol monostearate | 1.5 |

This coating was applied as a 15 weight percent solids solution in a solvent mixture of 65:35 tetrahydrofuran:-toluene (and about 0.1% water). The total dry coating weight was 4.3 g/m². After drying and heat aging, oxygen transmission rate measurements were performed at 25° C. and the relative humidities indicated below. Results are given in cm³/m²-day-atm.

| % RH | Run 1 | Run 2 | Average |
|---|---|---|---|
| 0 | 6.23 | 6.74 | 6.49 |
| 50 | 6.11 | 6.42 | 6.27 |
| 80 | 6.14 | 5.81 | 5.97 |
| 100 | 6.77 | 6.15 | 6.46 |

These OTR values are significantly poorer than values obtained for film with comparable VDC polymer coating without waxes in Comparative Example C5.

COMPARATIVE EXAMPLE C7

A 12 micrometer (48 gauge) base film of PET was coated on one surface only in the same manner as Comparative Example C5, using the VDC polymer composition and formulation set forth in Comparative Example C6. Two webs of this film were laminated using Adcote TM 506-40 (from Morton) with 9L10 catalyst, the coated surfaces facing outward. The total coating weight was about 4.0 g/m$^2$. OTR measured for this laminate at 25° C. and 80% relative humidity was 3.9 cm$^3$/m$^2$-day-atm. Although this OTR value is better than that of Comparative Example C6 due to the double thickness of the PET base film and the adhesive, it is still not as good as that of the film of Comparative Example C5, which is preferably because of its lower OTR and relative ease of manufacture.

EXAMPLE 10

To the film of Comparative Example C5 was added a two-sided coating of polyvinyl alcohol. The coating was done on a semiworks coating apparatus using a solution of 10 weight % PVOH in water. The total amount of the polyvinyl alcohol coatings was 1.6 g/m$^2$. After drying the coatings, the film was additionally two-sided coated with the VDC polymer composition defined in Comparative Example C5. The coating weight of the final, outer layers was 4.0 g/m$^2$. No fully formulated (wax-containing) top coating was used. After drying and heat aging, the following OTR values were measured at 25° C. (reported as cm$^3$/m$^2$-day-atm):

| % RH | Run 1 | Run 2 | Average |
|---|---|---|---|
| 0 | 0.00 | 0.02 | 0.01 |
| 50 | 0.00 | 0.00 | 0.00 |
| 80 | 1.10 | 1.15 | 1.13 |
| 100 | 1.30 | 1.84 | 1.57 |

The results show excellent barrier properties. The outstanding results at low relative humidity is attributed to the barrier properties of the polyvinyl alcohol layer. Even at high humidities the barrier is significantly improved, due, it is believed, to the improved properties of VDC polymer in the absence of waxes.

EXAMPLES 11–14

Films with multiple layers of VDC polymer coatings were prepared as described generally for Example 10. In each case the first or under layers were the VDC polymer composition described in Comparative Example C5. The second or outer layers were fully formulated (wax-containing) compositions as described in Comparative Example C6. In Example 13 there were additionally intermediate layers of polyvinyl alcohol provided (i.e., one on each side), in the amounts indicated. Details of the structures and barrier properties of these films are shown in Table III. OTR, in cm$^3$/m$^2$-day-atm, was measured at 25° C. and relative humidity as indicated; water vapor transmission rate (WVTR), in g/m$^2$-day, was measured at 38° C. and 90% relative humidity.

TABLE III

| Ex. | Coatings, g/m$^2$ | | | | OTR | | | | WVTR | |
|---|---|---|---|---|---|---|---|---|---|---|
|  | VDC 1 | PVOH | VDC 2 | Total | % RH | Run 1 | Run 2 | Run 3 | Run 1 | Run 2 |
| 11 | 3.9 | — | 2.0 | 5.9 | 80 | 2.77 | 2.54 | 2.48 | not meas'd | |
| 12 | 4.1 | — | 1.9 | 6.0 | 80 | 2.87 | 2.90 | — | 2.3 | 2.6 |
| 13 | 8.0 | 1.6 | 2.2 | 11.8 | 80 | 1.55 | 1.58 | — | 1.9 | 1.7 |
| 14 | 4.9 | — | 1.0 | 5.9 | 0 | 2.85 | 2.65 | — | not meas'd | |
| 14 |  |  |  |  | 50 | 1.67 | 1.64 | — | | |
| 14 |  |  |  |  | 80 | 2.50 | 2.36 | — | | |
| 14 |  |  |  |  | 100 | 21 | 22 | — | | |

(The high OTR measurements at 100% RH are believed to be the result of experimental error.)

All four structures exhibit good barrier properties, the major part of which appears to arise from the unformulated undercoating, VDC1. Even in the absence of an intermediate solvent barrier layer, a good combination of barrier properties and surface properties is obtained by limiting the presence of waxes to the surface VDC polymer layers.

EXAMPLE 15

A multiple layer structure was prepared by combining two-sided coatings as in Example 13, using, however, additional layers. To the base film was applied a first layer of the VDC composition of Comparative Example C5 (i.e., "VDC1"), a layer of polyvinyl alcohol, a second layer of the same VDC composition, a second layer of polyvinyl alcohol, and finally an outer layer of the VDC polymer composition of Comparative Example C6 (i.e., "VDC2"). The results at 25° C. in cm$^3$/m$^2$-day-atm are as follows:

| Coatings, g/m$^2$ | | | | | | OTR | | |
|---|---|---|---|---|---|---|---|---|
| VDC 1 | PVOH | VDC 1 | PVOH | VDC 2 | Total | Run 1 | Run 2 | (% RH) |
| 4.2 | 1.6 | 4.0 | 1.2 | 5.0 | 16.0 | <0.02 | <0.02 | (0) |
|  |  |  |  |  |  | <0.02 | <0.02 | (50) |
|  |  |  |  |  |  | 1.04 | — | (80) |
|  |  |  |  |  |  | 1.60 | 1.80 | (100) |

EXAMPLE 16

A film of PET 12 micrometers thick (48 gauge) was solution coated on one side first with 0.8 g/m polyvinyl alcohol, followed by a coating of 1.0 g/m$^2$ of the wax-free formulation of Comparative Example C5, followed by 2.0 g/m$^2$ of the fully compounded formulation of Comparative Example C6. Drying after each coating was as described in Example 1. The film thus prepared was aged at 50° C. for at least 48 hours. Evaluation of the Oxygen Transmission Rate. as described in Example 1, was performed. The results are as follows:

| % RH | Run 1 | Run 2 | Average |
|---|---|---|---|
| 0 | <0.06 | <0.06 | <0.06 |
| 50 | 0.16 | 0.31 | 0.24 |
| 80 | 6.71 | 6.52 | 6.62 |
| 100 | 18 | 21 | — |

(The high OTR at 100% RH is believed to be the result of experimental error.)

What is claimed is:

1. A coated film prepared by the following process:
   (a) applying a coating of solvent-borne polymeric composition to at least one surface of said film;
   (b) removing substantially all of the solvent from said at least one coating;
   (c) thereafter applying to the coated surface of said film a polymeric barrier layer;
   (d) applying to said polymeric barrier layer a subsequent coating of solvent-borne polymeric composition, carried in a solvent to which said polymeric barrier layer is substantially impermeable; and
   (e) removing the solvent from the subsequent coating; whereby the solvent carrying said subsequent coating does not permeate the underlying coating.

2. The coated film of claim 1 wherein the solvent which carries said subsequent coating of (d) is the same solvent which carries the underlying coating of (a).

3. The coated film of claim 2 wherein said polymeric barrier layer of (c) is applied from a solvent which does not permeate the underlying coating, which solvent is removed before applying said subsequent coating.

4. The coated film of claim 1 wherein said polymeric barrier layer is selected from the group consisting of polyvinyl alcohol, ethylene vinyl alcohol copolymers, methyl methacrylate vinyl alcohol copolymers, polyethyloxazoline, and mixtures thereof.

5. The coated film of claim 4 wherein said polymeric barrier layer is polyvinyl alcohol containing about 1 to 10 weight percent crosslinking agent.

6. The coated film of claim 1 wherein said underlying coating of (a) and said subsequent coating of (d) comprise at least one vinylidene chloride polymer.

7. The coated film of claim 6 wherein said vinylidene chloride polymer is a copolymer of at least about 85 weight percent polyvinylidene chloride with methacrylonitrile and methyl methacrylate.

8. The coated film of claim 7 wherein the solvent from which said coatings of vinylidene chloride polymer are applied is a mixture of touene and tetrahydrofuran.

9. The coated film of claim 1 wherein steps (c), (d), and (e) are repeated to provide a film with multiple polymeric barrier layers.

10. The coated film of claim 1 wherein the solvent-borne polymer of (a) is a polymeric vinylidene chloride composition containing less that about 3 weight percent organic formulation additives and the solvent-borne polymer of (d) is a polymeric vinylidene chloride composition containing at least about 3 weight percent organic formulation additives.

11. The coated film of claim 10 wherein the solvent-borne polymer of (a) contains less than about 1 weight percent organic formulation additives.

12. The coated film of claim 11 wherein the solvent-borne polymer of (a) contains less than about 0.5 weight percent organic formulation additives.

13. A coated film manufactured by the following process:
   (a) applying a coating of solvent-borne polymeric composition comprising at least one vinylidene chloride polymer to at least one surface of said film;
   (b) removing substantially all of the solvent from said at least one coating;
   (c) thereafter applying to the coated surface of said film, from a solvent comprising water, a water soluble polymeric barrier layer;
   (d) applying to said polymeric barrier layer a subsequent coating of solvent-borne polymeric composition comprising at least one vinylidene chloride polymer, carried in a solvent to which said polymeric barrier layer is substantially impermeable; and
   (e) removing the solvent from the subsequent coating; whereby the solvent carrying said subsequent coating does not permeate the underlying coating.

* * * * *